US010798051B1

(12) United States Patent
Sayko et al.

(10) Patent No.: US 10,798,051 B1
(45) Date of Patent: Oct. 6, 2020

(54) FILTERING AND ORGANIZING PROCESS FOR DOMAIN NAME SYSTEM QUERY COLLECTION

(71) Applicant: AT&T Intellectual Property I, L.P., Atlanta, GA (US)

(72) Inventors: Robert Sayko, Colts Neck, NJ (US); Kannu Beri, Colonia, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/420,817

(22) Filed: May 23, 2019

(51) Int. Cl.
G06F 15/16 (2006.01)
H04L 29/12 (2006.01)
H04L 29/08 (2006.01)

(52) U.S. Cl.
CPC ........ *H04L 61/1511* (2013.01); *H04L 61/251* (2013.01); *H04L 61/6059* (2013.01); *H04L 67/1038* (2013.01)

(58) Field of Classification Search
CPC ............... H04L 61/1511; H04L 61/251; H04L 61/6059; H04L 67/1038
See application file for complete search history.

(56) References Cited

U.S. PATENT DOCUMENTS

| 8,510,419 | B2* | 8/2013 | Wright | H04L 29/12066 370/252 |
| 9,003,040 | B2* | 4/2015 | MacCarthaigh | H04L 29/08288 709/226 |
| 9,602,333 | B2* | 3/2017 | Grimault | H04L 29/12066 |
| 9,667,590 | B2* | 5/2017 | Yan | H04L 61/1511 |
| 10,243,918 | B2* | 3/2019 | Zhang | H04L 61/2007 |
| 10,284,520 | B2* | 5/2019 | Reddy | H04L 63/0254 |
| 10,395,040 | B2* | 8/2019 | Carey | G06F 21/562 |
| 2015/0188877 | A1* | 7/2015 | Yan | H04L 67/28 709/245 |
| 2017/0111851 | A1* | 4/2017 | Zhang | H04W 24/02 |
| 2018/0219833 | A1* | 8/2018 | Reddy | H04L 61/1511 |
| 2019/0104186 | A1* | 4/2019 | Saltzman | H04L 67/22 |
| 2019/0182205 | A1* | 6/2019 | Zhang | H04L 61/2007 |
| 2019/0273713 | A1* | 9/2019 | Leach | H04L 61/1511 |

* cited by examiner

*Primary Examiner* — Moustafa M Meky (57) ABSTRACT

A method for filtering, distributing, and organizing domain name system queries in a communications network may include receiving a first domain name system query from a first endpoint device connected to the network, identifying a first network address of the first endpoint device from the first domain name system query, classifying the first domain name system query into a first class of a plurality of classes, wherein each class of the plurality of classes is associated with one predefined numerical range of a plurality of predefined numerical ranges, and wherein a target address unit of the first network address falls into the predefined numerical range associated with the first class, and forwarding the first domain name system query to a first collection server of a plurality of collection servers, wherein the first collection server is dedicated for collecting domain name system queries that are classified into the first class.

20 Claims, 3 Drawing Sheets

FILTERING AND ORGANIZING PROCESS FOR DOMAIN NAME SYSTEM QUERY COLLECTION

The present disclosure relates generally to communication networks, and more particularly to devices, non-transitory computer-readable media, and methods for filtering, distributing, and organizing domain name system queries to facilitate collection and data mining.

BACKGROUND

The Domain Name System (DNS) is one of the core building blocks of modern Internet infrastructure. For a given website, a record associating the website's uniform resource locator (URL) with one or more Internet Protocol (IP) addresses is maintained at a specific DNS authoritative server, or a DNS resolver. Thus, DNS resolvers conventionally play a key role in fulfilling DNS queries by translating readily memorized URLs into less readily memorized IP addresses. Moreover, queries submitted to DNS resolvers may contain a great deal of information about the Internet usage of Internet subscribers. This information, in turn, may help Internet service providers to improve service to their subscribers, e.g., by offering targeted services (such as advertisements) and/or by better understanding and engineering the Internet service provider networks.

SUMMARY

In one example, the present disclosure discloses a device, computer-readable medium, and method for filtering, distributing and organizing domain name system queries to facilitate collection and data mining. For example, a method may include receiving a first domain name system query from a first endpoint device connected to a communications network, identifying a first network address of the first endpoint device from the first domain name system query, classifying the first domain name system query into a first class of a plurality of classes, wherein each class of the plurality of classes is associated with one predefined numerical range of a plurality of predefined numerical ranges, and wherein a target address unit of the first network address falls into the predefined numerical range associated with the first class, and forwarding the first domain name system query to a first collection server of a plurality of collection servers, wherein the first collection server is dedicated for collecting domain name system queries that are classified into the first class.

In another example, a non-transitory computer-readable medium may store instructions which, when executed by a processing system in a communications network, cause the processing system to perform operations. The operations may include receiving a first domain name system query from a first endpoint device connected to a communications network, identifying a first network address of the first endpoint device from the first domain name system query, classifying the first domain name system query into a first class of a plurality of classes, wherein each class of the plurality of classes is associated with one predefined numerical range of a plurality of predefined numerical ranges, and wherein a target address unit of the first network address falls into the predefined numerical range associated with the first class, and forwarding the first domain name system query to a first collection server of a plurality of collection servers, wherein the first collection server is dedicated for collecting domain name system queries that are classified into the first class.

In another example, a device may include a processing system including at least one processor and a non-transitory computer-readable medium storing instructions which, when executed by the processing system when deployed in a communications network, cause the processing system to perform operations. The operations may include receiving a first domain name system query from a first endpoint device connected to a communications network, identifying a first network address of the first endpoint device from the first domain name system query, classifying the first domain name system query into a first class of a plurality of classes, wherein each class of the plurality of classes is associated with one predefined numerical range of a plurality of predefined numerical ranges, and wherein a target address unit of the first network address falls into the predefined numerical range associated with the first class, and forwarding the first domain name system query to a first collection server of a plurality of collection servers, wherein the first collection server is dedicated for collecting domain name system queries that are classified into the first class.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for filtering, distributing, and organizing domain name system queries to facilitate collection and data mining. As discussed above, queries submitted to DNS resolvers may contain a great deal of information about the Internet usage of Internet subscribers. This information, in turn, may help Internet service providers to improve service to their subscribers. For instance, the information may be used to create new sources of revenue, to reduce the costs of providing service (e.g., through network design), and the like.

However, processing this information is a challenge, particularly as the query traffic volume at the DNS servers increases. For instance, in some cases, the query traffic volume may exceed one million queries per second, and the rate of increase is only expected to grow year over year. The resources needed to capture useful data from such a volume of queries (e.g., servers to receive and process the data, as well as additional resources to balance and distribute the load among the servers) tend to be very complicated and expensive. As an example, many current methods for distributing and balancing the incoming queries involve intrusive parsing of the captured queries, which consumes a large amount of processing power. The consumption of the processing power, in turn, may limit performance.

Examples of the present disclosure distribute DNS records to servers or collectors for analysis in an efficient, coordinated manner based on the network addresses (e.g., IP address) of the records' sources. In one particular example, an incoming DNS query may be directed to a switch which is configured to identify a target address unit of the network address associated with the query's source. Within the context of the present disclosure, an "address unit" of an IP address is understood to refer to a grouping of bits in the IP address. For instance, in IP version 4 (IPv4), IP addresses are written in decimal form and comprises four octets. Each octet comprises eight bits and is separated from the next octet by a period. Thus, in an IPv4 address, an octet may be considered an address unit. However, in IPv6, IP addresss are written in hexadecimal form and comprise eight hextets. Each hextet comprises sixteen bits and is separated from the next hextet by a colon. Thus, in an IPv6 address, a hextet may be considered an address unit. Examples of the present disclosure are equally applicable to IPv4 and IPv6 addresses; thus, any reference herein to an "address unit" is understood to encompass both an IPv4 octet and an IPv6 hextet. However, examples of the present disclosure could be implemented to operate on units of network addresses other than IP addresses and on units of IP addresses that are not IPv4 or IPv6 addresses. Thus, use of the term "address unit" is not meant to limit the nature of the addressing scheme.

In one example, if the value of the target address unit falls within a first predefined range, then the query may be directed to a first collection server for further analysis. If, however, the value of the target address unit falls within a second predefined range, then the query may be directed to a second collection server for further analysis. Load balancing is therefore performed in a simple but efficient manner that speeds up the processing and forwarding of queries while consuming minimal processing power. Moreover, the disclosed technique inherently organizes incoming DNS queries, which further reduces the processing that downstream applications might normally have to perform on the queries.

Although examples of the disclosure are described within the context of DNS queries, it will be appreciated that the methods, computer-readable media, and devices described herein could be applied to a much broader range of Internet subscriber data. Moreover, the examples of the present disclosure are not limited to Internet Protocol, but could be used to process subscriber data using other, non-IP protocols. These and other aspects of the present disclosure are discussed in greater detail below in connection with the examples of FIGS. 1-3.

Figure 1:
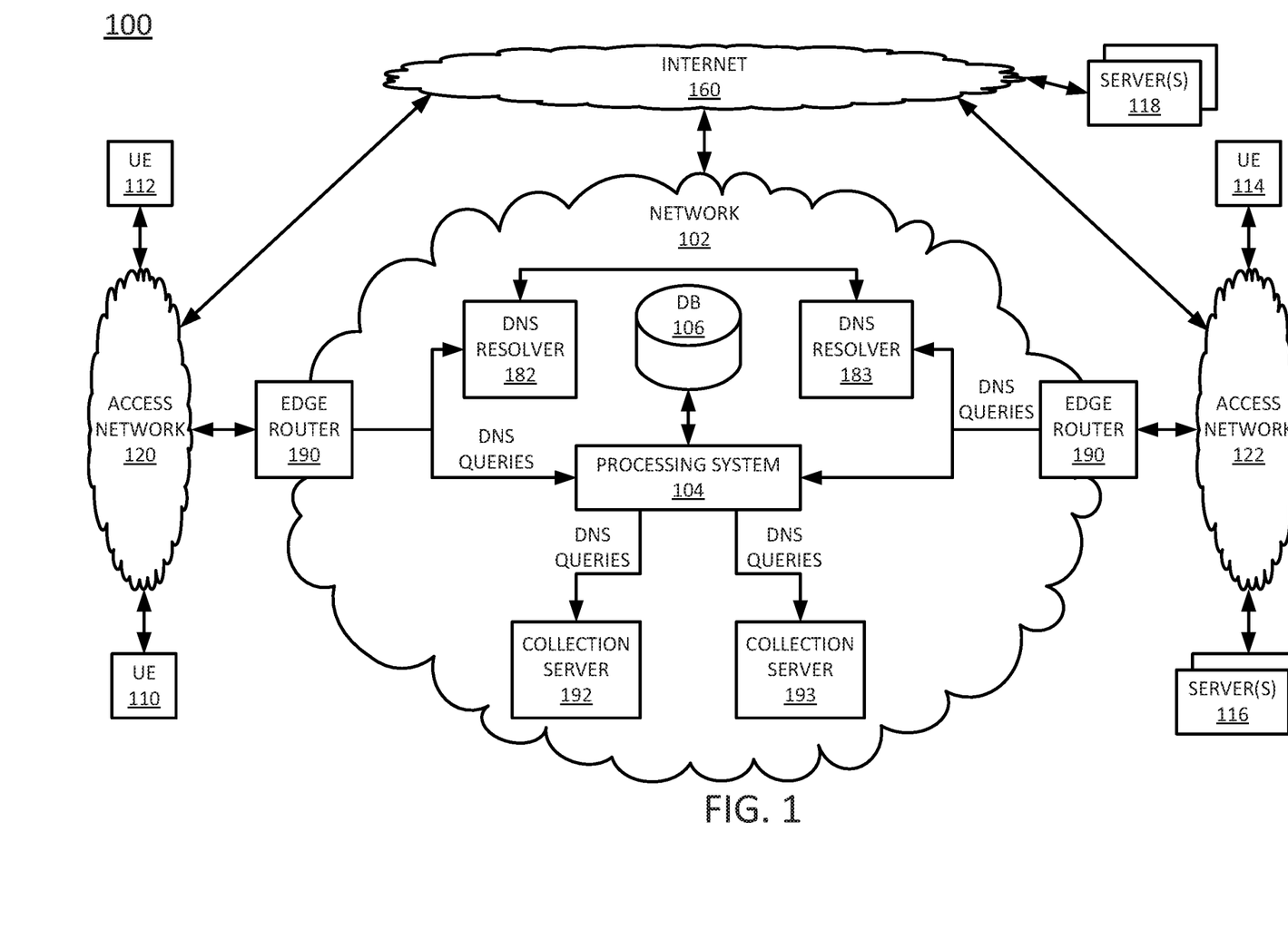
FIG. 1 illustrates an example network related to the present disclosure.

To further aid in understanding the present disclosure, FIG. 1 illustrates an example system 100 in which examples of the present disclosure for load balancing for domain name system query collection may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102. The network 102 may be in communication with one or more access networks 120 and 122, and with the Internet 160. In one example, network 102 may combine core network components of a wired or cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth. As further illustrated in FIG. 1, network 102 may include a processing system 104, a database (DB) 106, a plurality of DNS resolvers 182-183, a plurality of edge routers 190-191, and a plurality of collection servers 192-193. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access networks 120 may be in communication with one or more user endpoint (UE) devices 110 and 112. Similarly, access networks 122 may be in communication with one or more UE devices, e.g., UE device 114. Access networks 120 and 122 may transmit and receive communications between UE devices 110, 112, and 114, between UE devices 110, 112, and 114, and servers 116, servers 118, DNS resolvers 182-183, other components of network 102, devices reachable via the Internet in general, and so forth. In one example, each of UE devices 110, 112, and 114 may comprise any single device or combination of devices that may comprise a user endpoint device. For example, the UE devices 110, 112, and 114 may each comprise a mobile device, a cellular smart phone, a laptop, a tablet computer, a desktop computer, an application server, a bank or cluster of such devices, and the like. In one example, any of the UE devices 110, 112, and 114 may comprise sensor devices with wireless networking hardware, e.g., Internet of Things (IoT) devices, for gathering measurements of an environment, uploading the measurements to one or more servers or other devices, and so forth.

In one example, the access network 122 may also be in communication with one or more servers 116. Similarly, one or more servers 118 may be accessible to UE devices 110, 112, and 114, to servers 116, and so forth via Internet 160 in general. Each of the one or more servers 116 and one or more servers 118 may be associated with one or more IP addresses to enable communications with other devices via one or more networks. Each of the server(s) 116 and server(s) 118 may be associated with, for example, a merchant, a service business, a news source, a weather source, a school, a college or university, or other educational content providers, a social media site, a content distribution network, a cloud storage provider, a cloud computing application host, and so forth.

Figure 3:
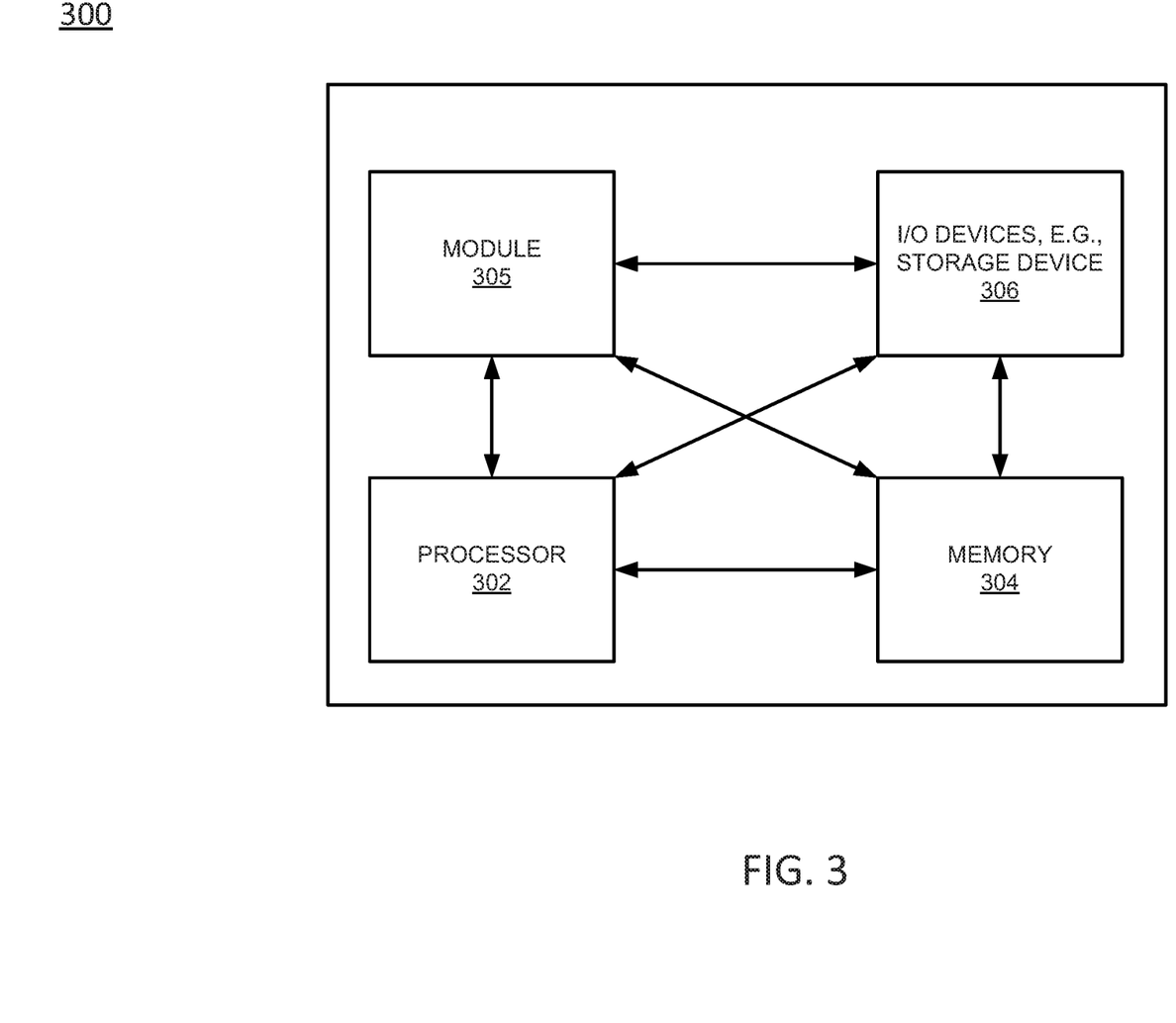
FIG. 3 illustrates an example of a computing device, or computing system, specifically programmed to perform the steps, functions, blocks, and/or operations described herein.

In accordance with the present disclosure, each of server (s) 116 and server(s) 118 may comprise a computing system or server, such as computing system 300 depicted in FIG. 3, and may be configured to provide one or more operations or functions in connection with examples of the present disclosure for filtering, distributing, and organizing domain name system queries, as described herein. For instance, although examples of the present disclosure are described primarily in connection with DNS traffic records, in other, further, and different examples, network traffic records may relate to other types of network traffic, such as: server connection request messages at one or more servers of one or more domains, e.g., transmission control protocol (TCP) SYN/ACK messaging, Uniform Datagram Protocol (UDP) messaging, IP packets for streaming video, streaming audio, or general Internet traffic, and so forth. Accordingly, in one example, network traffic data may be gathered and/or provided by server(s) 116 and/or server(s) 118. For instance, server(s) 116 and/or server(s) 118 may maintain server logs and may provide the servers logs or log summaries periodically or by request, may transmit exception messages or error messages, and so forth (e.g., to processing system 104).

In an illustrative example, UE device 110 may seek to obtain access to a webpage for a banking service, which may be hosted on one of the servers 118, but which may be unknown to the UE device 110 and/or a user of the device 110. To access the webpage, a DNS query from the UE device 110 may comprise, for example, the domain name "examplebank.com" and may be submitted to DNS resolver 182. DNS resolver 182 may provide the current IP address for device 110 to access examplebank.com if there is an associated record in a cache at DNS resolver 182. For instance, DNS resolver 182 may maintain records for domains that have been recently queried (e.g., within the last 12 hours, the last 24 hours, etc.), may maintain records for certain designated domains (e.g., the most popular 10,000 and/or the 10,000 most queried domains over the last six months), and so forth. Otherwise, DNS resolver 182 may seek the IP address from one or more other DNS resolvers (e.g., DNS resolver 183) or from a DNS authoritative server.

It should be noted that DNS architectures may include multiple layers (e.g., hierarchical layers) of DNS resolvers. In one example, DNS resolvers 182-183 may follow a recursive process for obtaining an IP address for a submitted query, by accessing other DNS resolvers and/or DNS authoritative servers. For ease of illustration, FIG. 1 illustrates a single layer of DNS resolvers including two DNS resolvers 182-183 is shown. However, any number of DNS resolvers and any number of layers of DNS resolvers may be deployed in the network 102 without departing from the scope of the present disclosure.

In accordance with the present disclosure, processing system 104 may comprise one or more physical devices, e.g., one or more computing systems or servers, such as computing system 300 depicted in FIG. 3, and may be configured to provide one or more operations for load balancing for domain name system query collection, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, database (DB) 106 may comprise a physical storage device integrated with processing system 104 (e.g., a database server), or attached or coupled to the processing system 104, to store various types of information in support of systems for load balancing for domain name system query collection, in accordance with the present disclosure. For example, DB 106 may store network traffic data, or other records from which network traffic data may be derived, may store mappings or tables that indicate ranges or groupings of DNS queries that are collected by the individual collection servers, such as collection servers 192 and 193, and so forth. In one example, processing system 104 may load instructions into a memory, or one or more distributed memory units, and execute the instructions for load balancing for domain name system query collection, as described herein. An example method for load balancing for domain name system query collection is described in greater detail below in connection with FIG. 2.

In one example, processing system 104 and collection servers 192 and 193 may operate in a distributed and/or coordinated manner to perform various steps, functions, and/or operations described herein. To illustrate, processing system 104 may obtain incoming DNS queries (e.g., from edge routers 190 and 191, which may be configured to port mirror the incoming DNS queries), identify network addresses (e.g., IP addresses) of the sources of the incoming DNS queries, classify the incoming DNS queries according to target portions of the network addresses from which the incoming DNS queries come, and forward the incoming DNS queries to the appropriate collection servers (e.g., collection servers 192 and 193) based on the classifying. The incoming DNS queries may originate with sources including the UE devices 110, 112, and/or 114, or server(s) 116. In some examples, the processing system 104 may comprise a portion of a front end switch, a load balancer, or a collection server (e.g., a collection server that is independent or separate from the collection servers 192-193).

Figure 2:
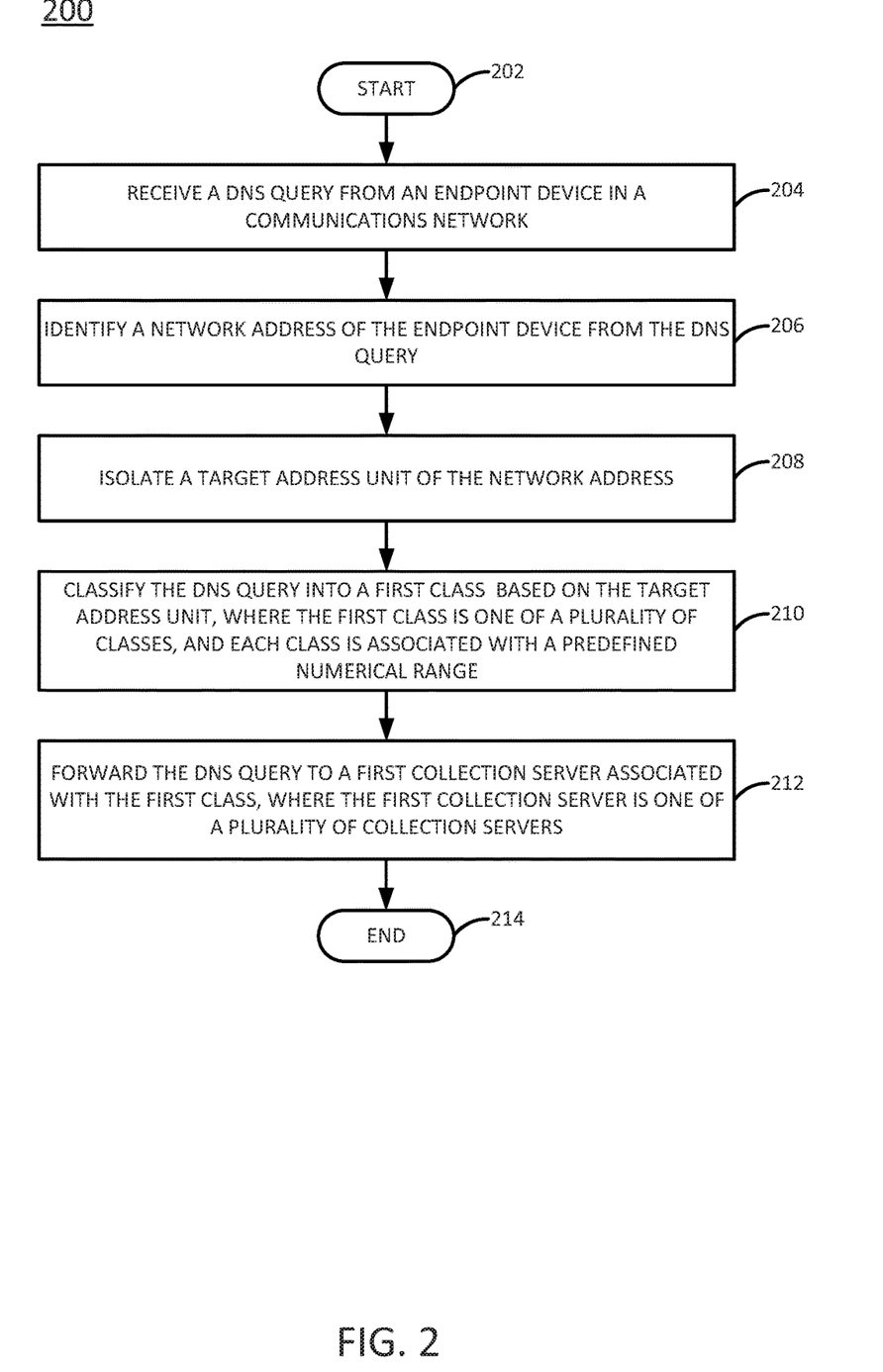
FIG. 2 illustrates a flowchart of an example method for filtering, distributing, and organizing domain name system queries, in accordance with the present disclosure.

The collection servers 192-2913 may comprise short term storage that retains the DNS queries until the DNS queries can be stored in appropriate Data Lakes (e.g., repositories of DNS queries that may be mined for data). In one example, each collection server 192 or 193 may correspond to one Data Lake. Although FIG. 2 illustrates two collection servers 192-193, any number of collection servers that is a power of two (e.g., two, four, eight, sixteen, thirty-two, etc.) may be deployed in the network 102. Moreover, it should be noted that various techniques may be employed to provide load balancing among the collection servers and to organize incoming DNS queries. Several of these techniques are discussed in greater detail in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet 160 may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. For example, device 114 and server(s) 116 may communicate with network 102 via different access networks, UE devices 110 and 112 may communicate with network 102 via different access networks, and so forth. In still another example, one or more of DNS resolvers 182-183 may be deployed external to network 102 (e.g., a public DNS resolver), or the system 100 may include one or more additional DNS resolvers external to network 102. Thus, these and other modifications are all contemplated within the scope of the present disclosure.

FIG. 2 illustrates a flowchart of an example method 200 for filtering, distributing, and organizing domain name system queries, in accordance with the present disclosure. In one example, steps, functions and/or operations of the method 200 may be performed by a device as illustrated in FIG. 1, e.g., processing system 104, collection servers 192-193, or any one or more components thereof, or collectively via a plurality devices in FIG. 1, such as processing system 104 and collection servers 192-193, and so forth. In one example, the steps, functions, or operations of method 200 may be performed by a computing device or system 300, and/or a processing system 302 as described in connection with FIG. 3 below. For instance, the computing device 300 may represent at least a portion of processing system 104 and/or collection servers 192-193 in accordance with the present disclosure. For illustrative purposes, the method 200 is described in greater detail below in connection with an example performed by a processing system, such as processing system 302. The method 200 begins in step 202 and proceeds to step 204.

At step 204, the processing system (of a domain name system) may receive a DNS query from an endpoint device. The DNS query may be forwarded to the processing system by an edge router, which may port mirror incoming DNS queries before simultaneously sending the queries on to DNS resolvers and to the processing system. In other examples, the DNS query may be duplicated in another way (e.g., by a tap, redirection, or other methods) before being forwarded to the processing system. The DNS query may comprise, for example a domain name associated with a webpage that the endpoint device (or a user of the endpoint device) is trying to access (e.g., examplebank.com). While a DNS resolver attempts to provide the endpoint device with the webpage's IP address, the processing system may perform further processing on the DNS query in order to facilitate future data mining operations.

In step 206, the processing system may identify the network address of the endpoint device from the DNS query. For instance, the header of a data packet containing the DNS query as a payload may include a source IP address, which indicates the IP address of the endpoint device from which the DNS query originated.

In step 208, the processing system may isolate a target unit of the network address of the endpoint device. As discussed in further detail below, the target unit of the network address may depend on the classification scheme that is being used to organize incoming DNS queries. In one example, where the network address is an IP address, the target unit of the network address is the last address unit of the IP address. For instance, if the IP address is the IPv4 address of 123.45.67.89, then the last address unit (octet) would be 89. In other examples, however, different address units (e.g., the second to last or third to last address unit, etc.) of the IP address could serve as the target unit of the network address.

In step 210, the processing system may classify the DNS query based on the target unit. In one example, there are a plurality of potential classes into which the DNS query may be classified. The number of potential classes may correspond to the number of collection servers in the network. For instance, if the network includes two collection servers (as illustrated in FIG. 1), then there may be two potential classes into which the DNS query may be classified. However, as discussed above, in one example, any number of collection servers that is a power of two may be deployed in the network. Thus, if there are four collection servers, there may be four classes into which the DNS query may be classified; if there are eight collection servers, there may be eight classes; and so on. In other examples, however, the number of servers may be a number that is not a power of two.

In one example, each class of the plurality of classes is associated with a predefined numerical range. In this case, the DNS query may be sorted into the class whose predefined numerical range encompasses the target unit of the source's network address. For instance, if there are two classes into which the DNS query may be classified, the first class may include DNS queries where the last octet of the source IPv4 address is anywhere in the range of one to 255, and the second class may include DNS queries where the last octet of the source IPv4 address is greater than 255. In this case, if the last octet of the source IP address is 89, then the DNS query may be classified in the first class (i.e., 1<89<255). Different numerical ranges may be used for the classification of IPv4 addresses, as well as for the classification of IPv6 addresses which use a different addressing scheme (e.g., in the case of IPv6, different ranges of hexadecimal values may be associated with different classes).

In step 212, the processing system may forward the DNS query to a first collection server of a plurality of collection servers. As discussed above, the network may include a plurality of (i.e., at least two, and potentially any power of two) collection servers for temporarily storing DNS queries. Each collection server of the plurality of collection servers may be associated with a different class of DNS queries. As also discussed above, each class may include DNS queries where the last address unit of the source IP address falls within a different predefined numerical range. Thus, in step 212, the first collection server may be the collection server that is associated with the class into which the DNS query is classified in step 210 (e.g., a collection server associated with DNS queries where the last octet of the source IPv4 address is anywhere in the range of one to 255).

The method 200 may end in step 214. However, the method 200 may be repeated for each incoming DNS query that is received by the processing system.

The method 200 therefore supports the large volumes and high bandwidth that have become typical when mining DNS queries for data, while minimizing the resource and computational costs of balancing and distributing the DNS queries among collection servers. For instance, while conventional techniques may parse the DNS queries to facilitate balancing and distribution of the queries among collection servers, the method and system disclosed herein accomplish the same quickly and efficiently by using the source addresses (e.g., network addresses) of the queries to direct the queries to the appropriate collection servers. Moreover, the DNS queries are effectively organized by the simple classification scheme, which minimizes the computation that downstream applications may have to perform when processing the DNS queries. In further examples, criteria other than source address may be used to sort or classify the DNS queries.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for filtering, distributing, and organizing domain name system queries, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner fora particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for filtering, distributing, and organizing domain name system queries (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for filtering, distributing, and organizing domain name system queries (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    receiving, by a processing system in a communications network, a first domain name system query from a first endpoint device connected to the communications network;
    identifying, by the processing system, a first network address of the first endpoint device from the first domain name system query;
    classifying, by the processing system, the first domain name system query into a first class of a plurality of classes, wherein each class of the plurality of classes is associated with one predefined numerical range of a plurality of predefined numerical ranges, and wherein a target address unit of the first network address falls into a first predefined numerical range of the plurality of predefined numerical ranges that is associated with the first class; and
    forwarding, by the processing system, the first domain name system query to a first collection server of a plurality of collection servers, wherein the first collection server is dedicated for collecting domain name system queries that are classified into the first class.

2. The method of claim 1, wherein the first domain name system query is duplicated by an edge server in the communications network prior to being received by the processing system.

3. The method of claim 1, wherein the first network address is an internet protocol address.

4. The method of claim 3, wherein the target address unit of the first network address is a last address unit of the internet protocol address.

5. The method of claim 3, wherein the internet protocol address is an internet protocol version 4 address, and the target address unit is an octet of the internet protocol address.

6. The method of claim 5, wherein the plurality of classes comprises two classes, and the first predefined numerical range comprises a range from one to 255.

7. The method of claim 6, further comprising:
    receiving, by the processing system, a second domain name system query from a second endpoint device connected to the communications network;
    identifying, by the processing system, a second network address of the second endpoint device from the second domain name system query;
    classifying, by the processing system, the second domain name system query into a second class of the plurality of classes, wherein a target address unit of the second network address falls into a second predefined numerical range of the plurality of predefined numerical ranges associated with the second class; and
    forwarding, by the processing system, the second domain name system query to a second collection server of the plurality of collection servers, wherein the second collection server is dedicated for collecting domain name system queries that are classified into the second class.

8. The method of claim 7, wherein the second predefined numerical range comprises a range greater than 255.

9. The method of claim 3, wherein the internet protocol address is an internet protocol version 6 address, and the target address unit is a hextet of the internet protocol address.

10. The method of claim 1, wherein a number of the plurality of collection servers is a power of two.

11. The method of claim 10, wherein a number of the plurality of classes is equal to the number of the plurality of collection servers.

12. The method of claim 1, wherein each collection server of the plurality of collection servers corresponds to a different data lake.

13. The method of claim 1, wherein the processing system is implemented in a switch.

14. The method of claim 1, wherein the processing system is implemented in a collection server that is independent of the plurality of collection servers.

15. The method of claim 1, wherein the processing system is implemented in a load balancer.

16. A non-transitory computer-readable medium storing instructions which, when executed by a processing system in a communications network, cause the processing system to perform operations, the operations comprising:
    receiving a first domain name system query from a first endpoint device connected to the communications network;
    identifying a first network address of the first endpoint device from the first domain name system query;
    classifying the first domain name system query into a first class of a plurality of classes, wherein each class of the plurality of classes is associated with one predefined numerical range of a plurality of predefined numerical ranges, and wherein a target address unit of the first network address falls into a first the predefined numerical range of the plurality of predefined numerical ranges that is associated with the first class; and
    forwarding the first domain name system query to a first collection server of a plurality of collection servers, wherein the first collection server is dedicated for collecting domain name system queries that are classified into the first class.

17. The non-transitory computer-readable medium of claim 16, wherein the first network address is an internet protocol address.

18. The non-transitory computer-readable medium of claim 17, wherein the target address unit of the first network address is a last address unit of the internet protocol address.

19. The non-transitory computer-readable medium of claim 18, wherein the internet protocol address is an internet protocol version 4 address, the plurality of classes comprises two classes, and the first predefined numerical range comprises a range from one to 255.

20. A device comprising:
    a processing system including at least one processor; and
    a non-transitory computer-readable medium storing instructions which, when executed by the processing system when deployed in a communications network, cause the processing system to perform operations, the operations comprising:
receiving a first domain name system query from a first endpoint device connected to the communications network;
identifying a first network address of the first endpoint device from the first domain name system query;
classifying the first domain name system query into a first class of a plurality of classes, wherein each class of the plurality of classes is associated with one predefined numerical range of a plurality of predefined numerical ranges, and wherein a target address unit of the first network address falls into a first predefined numerical range of the plurality of predefined numerical ranges that is associated with the first class; and
forwarding the first domain name system query to a first collection server of a plurality of collection servers, wherein the first collection server is dedicated for collecting domain name system queries that are classified into the first class.

* * * * *